Patented Oct. 21, 1952

2,615,008

UNITED STATES PATENT OFFICE 2,615,008

EPOXIDE RESIN COMPOSITIONS

Sylvan Owen Greenlee, Racine, Wis., assignor to Devoe & Raynolds Company, Inc., Louisville, Ky., a corporation of New York No Drawing. Application October 11, 1951, Serial No. 250,951

14 Claims. (Cl. 260—47)

This invention relates to epoxide resin compositions which are valuable compositions for use in the manufacture of varnishes, molding resins, adhesives, films, fibers, etc. The invention includes the new compositions and a two-step method for their manufacture and use.

The new compositions include a dihydric phenol and an epoxide resin resulting from the reaction of a mixture of a dihydric phenol with epichlorhydrin or glycerol dichlorhydrin and sufficient caustic alkali to combine with the chlorine of the chlorhydrin, the proportion of chlorhydrin (epichlorhydrin or glycerol dichlorhydrin) to dihydric phenol being at least about 1.2 to 1 and up to around 2 to 1.

The invention also includes a two-step method of forming high molecular weight epoxide resins in which an initial low molecular weight or melting point epoxide resin is first produced by the reaction of a dihydric phenol and epichlorhydrin or glycerol dichlorhydrin in the presence of caustic alkali sufficient to combine with the chlorine of the chlorhydrin, followed by removal of the byproduct salt and any excess alkali from the initial epoxide resin, with addition of dihydric phenol to the initial epoxide resin and heating the resulting mixture to effect reaction of the dihydric phenol with the initial epoxide resin to form higher melting point and higher molecular weight epoxide resins or insoluble and infusible reaction products.

In the first step of the two-step process, low molecular weight or melting point epoxide resins are produced which can be readily washed free from byproduct salt and any excess caustic alkali. Higher melting point epoxide resins cannot be readily washed free from such byproducts. But when the initial low melting point or low molecular weight epoxide resins are further reacted with dihydric phenols in the second step of the process, no byproducts are formed, and the reaction is a direct reaction of addition between the initial epoxide resin and the added dihydric phenol, in the second step of the process.

In making the initial epoxide resins from halohydrins the proportions of the polyhydric phenols and halohydrins are such that, for example, in the case of a dihydric phenol and epichlorhydrin or a dihalohydrin, substantially more than 1 molecular proportion of a difunctional chlorhydrin is used for 1 molecular proportion of dihydric phenol, and 2 or substantially less than 2 molecular proportions of the difunctional chlorhydrin are used for 1 molecular proportion of the dihydric phenol. Similarly with other polyhydric phenols and other polyfunctional chlorhydrins the proportions are such that the halohydrin is more than that which is equivalent to the polyhydric phenol and twice or less than twice the equivalent amount.

In making the initial epoxide resins from halohydrins the reaction of the polyhydric phenols and the halohydrins is advantageously carried out with the use of aqueous alkali in amounts sufficient to combine with the halogen of the halohydrins used, or in amounts somewhat in excess. Thus where the dihydric phenol is reacted with an epihalohydrin such as epichlorhydrin the proportion of alkali used is sufficient to combine with the chlorine of the epichlorhydrin or an amount somewhat in excess of that amount. When a dihalohydrin such as glycerol dichlorhydrin is used the amount of alkali is sufficient to combine with the chlorine of the dichlorhydrin, or an amount somewhat in excess of that amount. And when mixtures of epichlorhydrin and dichlorhydrin are used, the amount of alkali is similarly sufficient to combine with the chlorine or somewhat in excess of that amount.

The initial epoxide resins vary somewhat in their compositions and properties depending upon the dihydric phenols and chlorhydrins used and the conditions of the reaction.

The primary reaction involved in producing the initial epoxide resins from dihydric phenols and difunctional chlorhydrins, appears to be one in which the phenolic hydroxyls react with the chlorhydrins to give monomeric and straight chain polymeric products such as illustrated by the following formulas or structures:

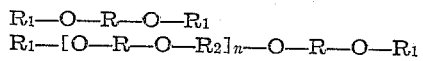

where R is the residue of a dihydric phenol, $R_2$ is an intermediate hydroxyl-containing residue of the chlorhydrin or dichlorhydrin, and $R_1$ is mainly an epoxy-containing residue and to some extent a hydroxyl-containing residue derived from the chlorhydrin. In the above formula $n$ represents the extent of polymerization, e. g. 1, etc.

In general the proportion of terminal epoxide residues or groups in the epoxide resin is in considerable excess of the terminal hydroxide-containing residues, so that the products approach diepoxides, e. g., diglycidyl ethers and polymeric ethers of the dihydric phenols.

The above formula of the polymeric epoxide resins assumes straight chain reaction which appears to be the primary reaction between the dihydric phenols and epichlorhydrin or dichlorhydrin. Reaction is not, however, excluded between the halohydrin and intermediate alcoholic hydroxyl groups such as would give branch chain formulas; and in the case of more complex polymers, where $n$ in the above formula is higher than 1, such side chain reaction products and polydimensional polymers are probably formed to some extent either by reaction of intermediate hydroxyl groups of intermediate reaction products with the halohydrin or with terminal epoxy groups of other intermediate reaction products. Since terminal epoxy groups can also react with terminal hydroxyl groups it may be that part of the polymerization takes place in this way.

It is difficult to determine the exact nature of the complex polymerization process which takes place but I am led to believe that the reaction is primarily one between the phenolic hydroxyls and the chlorhydrins and to a limited extent one of reaction of halohydrins or epoxide groups with aliphatic hydroxyl groups, and that the resulting complex hydroxy-epoxy compositions are largely straight-chain polymeric products of the formula indicated above and to some extent more complex polydimensional structures.

The initial epoxide resins vary from liquid or semi-solid products to solid resins.

The dihydric phenols used in making the intermediate epoxide resins may contain the hydroxyl groups in one nucleus as in resorcinol or in different nuclei of fused ring systems as in 1,5-dihydroxynaphthalene or in different nuclei or ring systems attached by chains composed of one or more atoms, in which case the chains should be free from elements which interfere with the reaction of chlorhydrins with the phenolic hydroxyl groups. The phenolic nuclei or the chains linking phenolic nuclei may contain substituents provided they do not interfere with the desired reaction of the chlorhydrins with the phenolic hydroxyl groups. Illustrative of dihydric phenols which may be used in making the new complex polymerization products are mononuclear phenols such as resorcinol, hydroquinone, catechol, phluorglucinol, etc. and polynuclear phenols such as bisphenol (p,p'-dihydroxydiphenyldimethyl methane), p,p'-dihydroxybenzophenone, p,p'-dihydroxydiphenyl, p,p'-dihydroxydibenzyl, bis-(4-hydroxyphenyl) sulfone, 2,2'-dihydroxy 1,1'-dinaphthyl methane, polyhydroxy naphthalenes and anthracenes, o,o',p'-tetrahydroxy diphenyl dimethyl methane and other dihydroxy or polyhydroxy diphenyl or dinaphthyl methanes, etc.

A particularly advantageous polyhydric phenol for use in making the new compositions is bisphenol (p,p'-dihydroxydiphenyldimethyl methane).

The difunctional or polyfunctional chlorhydrins useful in making the initial epoxide resins include monochlorhydrins such as epichlorhydrin, dichlorhydrins such as glycerol dichlorhydrin, bis (3-chloro,2-hydroxy propyl) ether, 1,4-dichloro, 2,3-dihydroxy-butane, 2-methyl-2-hydroxy, 1,3-dichloropropane, bis (3-chloro, 2-methyl, 2-hydroxy propyl) ether and other mono and dichlorhydrins derived from aliphatic olefins, mannitol, sorbitol and other alcohols. Epichlorhydrin is particularly advantageous for use in making the initial resins in the first step of the process.

In making the initial epoxide resins from chlorhydrins the dihydric phenols, e. g., bisphenol, and the polyfunctional chlorhydrins are advantageously all added together at the outset together with aqueous alkali which may be used to dissolve or partly dissolve the polyhydric phenol to form the polyphenoxide or a monophenoxide either before admixture with the chlorhydrin or after admixture. The amount of caustic alkali added to dissolve or partially dissolve the phenol, and whether present at the outset or added in successive amounts, should be sufficient to combine with the chlorine of the chlorhydrin used. With epichlorhydrin for example the amount of caustic alkali should be equal to or somewhat in excess of the theoretical amount for combining with the chlorine of the epichlorhydrin. With glycerol dichlorhydrin 2 mols of caustic alkali or somewhat more are required for 1 mol of the dichlorhydrin. The presence of an excess of alkali is advantageous in securing completion of the reaction, and also influences the polymerization and the nature of the polymerization products as well as the relative proportions of epoxide groups and terminal hydroxy-containing groups.

Products of a predetermined degree of polymerization and of different degrees of polymerization can be obtained by regulating the proportions of the reactants used. Thus, to give a composition having the general or approximate composition indicated by the above formula where $n=1$ the proportions of epichlorhydrin and bisphenol should be about 3:2. Products of higher degree of polymerization and increased complexity of composition are obtained with lower ratios of epichlorhydrin to bisphenol. For example, a product made from 5 mols of epichlorhydrin and 4 mols of bisphenol would have a theoretical composition approximating that of the above formula where $n=3$. A low molecular weight resin varying from a liquid to a soft solid and with a large proportion of liquid monomeric polyethers of dihydric phenols can be made by reacting 2 mols of epichlorhydrin with 1 mol of bisphenol. Yields of products can be obtained which represent or approximate the theoretical yields indicating that the complex polymerization products contain the phenolic and halohydrin residues in substantially the same proportion in which the reactants are used.

The range of proportions and degree of polymerization in making the initial resins can be varied over a considerable range but the chlorhydrin should be in substantial excess of the equivalent proportions to insure terminal epoxycontaining groups and should be twice or less than twice the equivalent proportions. The production of the polymeric products requires in general, in the case of a dihydric phenol and epichlorhydrin or dichlorhydrin, a range of proportions varying from about 2 of the polyhydric phenol and 3 of the difunctional chlorhydrin to a higher proportion of polyhydric phenol to chlorhydrin approaching equivalent proportions but with sufficient excess of the chlorhydrin over equivalent proportions so that the complex polymeric products will contain terminal epoxide groups. With bisphenol and epichlorhydrin ranges of proportions corresponding to that of the above formula where $n$ is from 1 to 5 are particularly advantageous, giving complex reaction products having a melting point up to around 100° C. or higher and from which the salt formed as a by-product and any excess caustic may be removed by washing.

Higher polymeric products of higher melting point which cannot be readily washed to remove salt or any excess caustic can advantageously be produced by the two-step process in which a lower melting polymeric product is first formed which can be readily freed from by-product salt and excess caustic, and with further reaction of this intermediate purified product with an additional amount of dihydric phenol which is less than the equivalent of the epoxide groups of the intermediate product so that the higher polymeric products will still contain epoxy groups.

The process which can be advantageously used in preparing the initial epoxide resins will be illustrated in connection with the reaction of bisphenol with epichlorhydrin.

A caustic soda solution is made containing 1 mol caustic soda per mol of bisphenol dissolved in an amount of water, e. g., twice that of the weight of the bisphenol to be used. The bisphenol is then added to the caustic solution in a suitable reaction kettle provided with a stirrer and stirred until the phenol is dissolved. The use of this amount of alkali is sufficient to convert only half of the phenolic hydroxyls of the bisphenol into phenoxide. The epichlorhydrin is then added to the solution at a temperature of 34–45° C. with continuous agitation of the reaction mixture. The temperature rises over a period of e. g., 30 minutes to around 60–75° C. depending upon the initial temperature, the batch size and the amount of water used, larger amounts of water tending to control the exothermic reaction temperature. The temperature rise due to the exothermic reaction can be controlled to some extent by using larger or smaller amounts of water.

After this preliminary reaction an additional amount of sodium hydroxide conveniently in water solution, and sufficient in amount with that previously added, to react completely with the chlorine of the epichlorhydrin is added, and heat is applied if necessary to raise the temperature to around 80–85° C. over a period of around 15–20 minutes. A further amount of sodium hydroxide in water is advantageously added at this point, in excess of the theoretical amount required to react with all of the chlorine present in the epichlorhydrin, and this amount may advantageously be an appreciable excess of caustic soda to secure a higher degree of polymerization in the reaction mixture or to bring the reaction to the desired extent in a shorter period of time. The mixture is heated to around 95° C. and held at around 95–100° C. for a sufficient length of time to give the desired products which may vary e. g. from ½ hour to 3 hours or more.

The reaction mixture separates into an upper aqueous layer which is drawn off and the residue, e. g., of taffy-like consistency settles to the bottom. This product is then washed by stirring with hot water for 25–30 minutes after which the wash water is drawn off. This washing procedure is repeated e. g., 4 to 6 times, or as many times as is necessary, to effect removal of any unreacted sodium hydroxide and the byproduct sodium chloride. Dilute acids such as acetic or hydrochloric acid may be used to neutralize the excess caustic during washing. It is usually desirable to wash the product entirely free from salt and caustic since failure to remove the unreacted caustic or basic salts such as sodium acetate may result in further polymerization during the drying process when heat is applied to remove the last traces of water. The wet resin is dried by heating and stirring until the temperature rises substantially above the boiling point of water.

The above procedure has been found an advantageous procedure for use in producing the initial epoxide resins. The addition of alkali in stages and with only partial conversion of bisphenol into phenoxide in the first stage results in reaction of the bisphenol with part of the epichlorhydrin and the removal of chlorine from only part of the epichlorhydrin while part of the phenolic hydroxyls of the bisphenol are left in a free state such that they are free to react with epoxide groups. The subsequent addition of caustic is sufficient to remove chlorine from the remaining epichlorhydrin in the further carrying out of the process while the use of a regulated excess of alkali over that required for combining with the chlorine to form salt aids in promoting and controlling the further carrying out of the process.

Where all of the caustic alkali is added at the beginning of the process and all of the reactants are added the reaction is more exothermic and temperature control may be necessary by external cooling or the addition of ice or cold water to keep the reaction under control. Excessive amounts of caustic sometimes causes further polymerization so that it becomes difficult to control the melting point of the product. Lesser amounts of excess caustic approaching the theoretical require longer reaction periods for the process. In general the process should be controlled so that the reaction product does not have a melting point more than 10–15° higher than the temperature of the water used for washing. Thus a product having a softening point or melting point (Durran's mercury method) of around 60° C. may be prepared and washed at a temperature above e. g., 45–50° C. A product whose softening point is around 125° C. may be prepared and washed in a closed pressure kettle at temperatures above 110–115° C.

A typical example illustrative of the process in which approximately 3 mols of bisphenol is reacted with 4 mols of epichlorhydrin and an amount of sodium hydroxide approximately 25% in excess of the theoretical is carried out as follows: The ingredients used were as follows: 307.5 pounds bisphenol, 166.3 pounds epichlorhydrin, 96 pounds caustic soda, 600 pounds water. 54 pounds of the caustic were dissolved in 600 pounds of water in an open kettle provided with a mechanical agitator. The bisphenol was added and the mixture stirred for about 10 minutes at a temperature of about 33° C., the epichlorhydrin was added and the temperature increased to about 65° C. from the exothermic heat of reaction. A solution of 18 pounds of caustic soda dissolved in 4 gallons of water was then added with continued stirring with a rise of temperature to around 79° C. Heat was applied to raise the temperature to about 85° C. and a solution of 24 pounds of caustic soda dissolved in 5 gallons of water was added and heating continued while maintaining a temperature around 90 to 100° C. for a period of about 1 hour. External heating was discontinued, 5 gallons of cold water added to check boiling of the water and the upper aqueous layer was then drawn off.

The product was washed with 50–60 gallons of boiling water for a period of 20 minutes, then with a similar amount of boiling water containing acetic acid to neutralize unreacted caustic soda and then 4 times in succession with a similar amount of boiling water. After as much as possible of the water had been removed, external heat was applied with continued stirring to dry the product, the temperature rising to 150° C. The liquid product was drawn off and allowed to solidify, and had a softening point of 95° C. (Durran's mercury method).

Higher melting point products which cannot be readily washed with water may advantageously be prepared by proceeding in two steps. Thus where products are desired having a melting point of e. g. around 150° C., such that they cannot be readily freed from salt and excess caustic by washing, they can advantageously be produced by a two step procedure. While such a product, if prepared by the above process, could be washed in a pressure kettle with water heated to around 145–150° C., this requires special pressure equipment. The use of such high pressures and temperatures is avoided when the following two step procedure is used.

In this two step procedure an epoxide-containing product is first produced which melts e. g. at 80° C. Such a product can be easily prepared at temperatures above 65–70° C. and washed with hot water at atmospheric pressure in an open or closed kettle. This product, free from caustic, water and salts, is then admixed with an additional amount of polyhydric phenol, less than that corresponding to the epoxy content of the product with which it is admixed, and the mixture then heated to effect the action of the polyhydric phenol with part of the epoxy groups of the initial product to give a product that melts e. g. at 150° C. and which needs no purification since no by-products are formed in this second step of the process.

In some cases it is desirable, in the second step of the two step process, to add traces of catalysts such as sodium hydroxide or sodium acetate, to catalyze the further reaction to produce the higher melting products but these catalytic substances are used in such small quantities that they are not detrimental to the product for most of its uses, and their removal by washing or other methods is unnecessary.

In order to regulate the amount of dihydric phenol which is added in the second step of the process the epoxide equivalent of the initial product of the first step of the process is determined, as hereinafter described, and an amount of dihydric phenol is added which is less than that equivalent to the epoxide content so that only part of the epoxide groups of the complex composition are utilized in forming the further polymeric product, and leaving an excess of epoxide content of the resulting product such that it is still an epoxy-hydroxy product still capable of reaction e. g. by polymerization with the addition of a polymerization catalyst, or cross-linking reactant.

The nature and advantages of the invention will be further illustrated by the following specific examples, but it will be understood that the invention is not limited thereto. The parts are by weight.

Where molecular weight determinations are given they were made by a standard boiling point elevation method. In some cases the molecular weight values corresponded approximately to the theoretical values for a straight chain polymer of the formula given above. In some cases a higher molecular weight value was obtained, seemingly indicating a more complex structure. When short periods of reaction are used incomplete reaction products of lower average molecular weight may be formed which however are capable of further reaction. As above pointed out, an appreciable excess over the theoretical amount of caustic alkali favors the completion of the reactions while excess caustic and prolonged reaction periods seem to favor side reactions.

In some cases the equivalent weights to esterification were determined by heating the epoxide composition with about twice the theoretical amount of linseed oil acids necessary to react with all the hydroxyl and epoxy groups at 228° C. until a constant acid value was obtained. By back titrating the unreacted linseed acids, the esterifiable hydroxyl content was calculated from the acid values. In view of the possibility or probability that some polymerization takes place during this high temperature esterification the results can only be considered a rough indication of the total hydroxyl plus epoxy groups esterified.

The epoxide group content of the complex epoxide resins was determined for practical purposes by determining the equivalent weight of the composition per epoxide group. The method used for determining the epoxide content of the epoxide resins hereinafter indicated was by heating one gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1N sodium hydroxide using phenolphthalein as indicator, and considering that 1 HCl is equivalent to one epoxide group.

The carrying out of the first step of the two-step process, and the production of the initial epoxide resins for use with added dihydric phenol in making the new compositions and in carrying out the second step of the process is illustrated by the following examples:

*Example 1.*—798 parts of bisphenol were dissolved in a caustic soda solution made by dissolving 200 parts of caustic soda in 1730 parts of water in a stainless steel kettle, and 650 parts of epichlorhydrin were added to the closed kettle. The kettle was provided with a stirrer and the mixture was stirred during the process. The temperature rose from around 37° C. to around 70° C. in about 45 minutes. 80 parts of caustic soda in 200 parts of water were then added with further increase in temperature to about 82° C. in about one-half hour. 29 parts of caustic soda in 100 parts of water were then added and the kettle was heated to raise the temperature gradually to about 95° C. in about one hour. The aqueous liquor was then drawn off and hot wash water applied with agitation, and a series of four washing treatments with fresh water was applied until the product became neutral to litmus. The product was then dried by heating to a final temperature of 130° C., and drawn from the kettle.

In the above example 2 mols of epichlorhydrin are used for 1 mol of bisphenol with an amount of caustic soda somewhat in excess of 2 mols. The softening point of the resulting resinous product determined by Durran's mercury method was 43° C. The approximate molecular weight determined by a standard boiling point elevation method was about 451. The determination of the epoxide groups in the product showed an equivalent weight of 325 per epoxide group which would represent approximately 1.39 epoxy groups per molecule of the average molecular weight indicated, and an equivalent weight to esterification of 84.5.

While the product is a homogeneous product, it is a composite product made up of monomeric and polymeric epoxide ethers of bisphenol. By fractional extraction with normal heptane a liquid fraction is obtained, leaving a higher melting point resin. By fractional distillation at 1 micron pressure and between 160° C. and 300° C. approximately half the material distilled and a large part of this distillate was liquid and apparently made up largely of diglycide ether of bisphenol with some hydrolyzed epoxide and some polymeric product. Fractions were thus obtained having an epoxide equivalent of 183 to 184 and fractions having somewhat higher epoxide equivalents up to around 300. The residual resin had a melting point of about 62.5° C. and an epoxide equivalent of about 525. In referring to average molecular weight based on a standard boiling point elevation method, accordingly, and epoxide groups per molecule based on the average molecular weight, these figures do not represent a homogeneous, uniform product but a mixture of monomeric and polymeric liquid and solid resins including diepoxides and polymeric and hydrolyzed products.

*Example 2.*—912 parts of bisphenol were dissolved in aqueous alkali containing 330 parts of sodium hydroxide in 2500 parts of water in an apparatus provided with a stirrer and reflux condenser. 740 parts of epichlorhydrin were added while the solution was at a temperature of 60° C. and cooling was applied to maintain the temperature around 60 to 80° C. for a period of about one and one-quarter hours. After decanting the aqueous liquid the product was repeatedly washed with water and dried in vacuo. The resin was somewhat harder than that of Example 1, having a softening point of about 44° C., and on analysis for epoxide content showing an equivalent weight per epoxide group of about 340.

The second step of the two-step process, in which the epoxide resin first made is further reacted with a dihydric phenol, is illustrated by the following examples:

*Example 3.*—The resin of Example 1 was further reacted by adding 57 parts of bisphenol and 0.055 part of sodium hydroxide to 325 parts of resin, corresponding to an equivalent of about 0.5 phenolic hydroxyls per epoxide group, sufficient to react with only about one-half of the epoxide groups of the resin, and this mixture was heated for 90 minutes at 150° C. and gave a product having a softening point of 74° C. and an equivalent weight to epoxide of 532.

*Example 4.*—The resin of Example 1 was further reacted by adding 114 parts of bisphenol to 325 parts of resin without the addition of sodium hydroxide, the amount of bisphenol being approximately equivalent to the epoxy content of the resin, and this mixture was heated for 90 minutes at 150° C. and gave a higher melting point resin having a softening point of 106° C. and an equivalent weight to epoxide of 1506.

*Example 5.*—The resin of Example 1 was further reacted by adding 42 parts of phloroglucinol to 325 parts of resin, corresponding to an equivalent of about one phenolic hydroxyl per epoxide group, and this mixture was heated for 90 minutes at 200° C. and gave an infusible product.

*Example 6.*—A mixture of 5 mols bisphenol and 7 mols epichlorhydrin were reacted with 9.05 mols caustic soda, the reaction going from 40 to 91° C. over 70 minutes and being maintained at 90–104° C. for 75 minutes. The product after washing had a softening point of 84° C., an average molecular weight of 791 and an equivalent weight to epoxide of 591.5 corresponding to an average of about 1.3 epoxy groups per molecule, and an equivalent weight to esterification of 175.5.

The resin as above produced was further reacted by adding 42.4 parts of bisphenol to 591.5 parts of resin, corresponding to an equivalent of 0.372 phenolic hydroxyls per epoxide group and sufficient to react with only about ⅓ of the epoxy groups of the resin, and this mixture was heated for 90 minutes at 200° C. and gave a product having a softening point of 121° C., and equivalent weight to esterification of 205 and an equivalent weight to epoxide of 1248.

When a somewhat larger amount of bisphenol (84.8 parts to 591.5 of resin), representing an equivalent of 0.475 was similarly mixed with the same initial resin and similarly heated, the resulting resin had a softening point of 146° C., an equivalent weight to esterification of 225, and an equivalent weight to epoxide of 3155.

*Example 7.*—A mixture of 3 mols of bisphenol and 4 mols of epichlorhydrin were reacted with the addition of caustic soda solution containing 5.2 mols, the temperature going from 30 to 100° C. in 85 minutes, and being kept at about 100° C. for 65 minutes. The resulting resin after washing and drying had a softening point of 90° C., an average molecular weight of 802, an equivalent weight to epoxide of 730, corresponding to about 1.1 epoxy groups per molecule, and an equivalent weight to esterification of 180.

The resin thus produced was admixed with bisphenol in the proportions of 57 parts of bisphenol to 730 parts of resin (equivalent to 0.5) and a very small amount of caustic soda (1.3 parts to 730 parts of resin) and heated for 90 minutes at 150° C. The resulting resin had a softening point of 127° C. and an equivalent weight to epoxide of 1241.

*Example 8.*—4 mols of bisphenol and 5 mols of epichlorhydrin were reacted with the addition of caustic soda solution (6.43 mols), the reaction going from 40 to 100° C. in 80 minutes, and being kept at 100–104° for 60 minutes. The resulting resin after washing and drying, had a softening point of 100° C., an average molecular weight of 1133, an equivalent weight to epoxide of 860, corresponding to about 1.3 epoxide groups per molecule, and an equivalent weight to esterification of 200.

The resin thus produced was admixed with 33 parts of hydroquinone to 860 parts of resin (0.6 equivalent to epoxide) and the mixture heated for 90 minutes at 200° C., giving a resulting resin having a softening point of 125° C., and an equivalent weight to epoxide of 1686.

When the same resin was similarly heated with 114 parts of bisphenol to 860 parts of resin, the resulting product had a softening point of 164° C. and an equivalent weight to epoxide of 5595.

*Example 9.*—A mixture of 6 mols of hydroquinone and 7 mols of epichlorhydrin were reacted with the addition of a solution of 7.5 mols of caustic soda, the reaction going from 29–99° C. in 85 minutes, and being held at 99–103° C. for 75 minutes. The resulting resin after washing and drying had a softening point of 92° C. and an equivalent weight to epoxide of 1105.

The resin thus produced was admixed with bisphenol in the proportions of 55.5 parts of bisphenol to 1105 parts of resin (0.48 equivalent to epoxide) and heated for 90 minutes at 200° C., giving a resin with softening point of 165° C.

In a similar way, other dihydric phenols can be reacted with epichlorhydrin to produce other initial low melting point epoxide resins which can similarly be freed from salt and excess alkali and then further reacted with added dihydric phenol in the second step of the process.

Instead of using epichlorhydrin for making the initial epoxide resin, glycerol dichlorhydrin can be similarly used.

The products made by the two-step process, in which the amount of added dihydric phenol in the second step is less than that which is equivalent to the epoxy content of the initial resin of the first step will be complex epoxy resins of higher melting point.

In general, the initial epoxy resins, and also the higher melting epoxide resins produced in the two-step process, are soluble, unless too highly polymerized, in solvents such as acetone, methyl ethyl ketone, diacetone alcohol, cyclohexanone, etc. The resins of lower melting point and lower degree of polymerization are soluble in toluene but the higher melting resins such as those produced by the two-step process are insoluble in this solvent. Solutions of the resins can be used in making clear and pigmented varnishes, in making transparent films and filaments, and in impregnating and laminating and coating wood, fabrics, and other porous or fibrous materials, etc. When a small amount of a suitable catalyst is added to the solution, the resulting film or coating, on heating, is converted into an infusible insoluble product.

The epoxide resins produced by the two-step process are capable of further reaction by polymerization or with other reagents to form final reaction products.

It is one of the characteristics of the high melting point epoxide resins that on final polymerization or reaction they tend to expand on hardening and differ in this respect from resins which shrink on hardening. This lack of contraction or slight expansion in the case of molded products on hardening is valuable for many applications, enabling tight fitting molded articles to be obtained.

The high melting point epoxide resins produced by the two-step process and containing reactive epoxide groups can be reacted with compounds containing active hydrogen, such as amines, and particularly polyamines, amides, mercaptans, polyhydric alcohols, polyimines, etc., to give a wide variety of valuable reaction products. Thus, difunctional reactants or polyfunctional reactants may serve to cross-link different molecules through reaction with terminal epoxide groups and in some cases through intermediate hydroxyl groups. The use of less than the equivalent amount of cross-linking reagents enables modified products to be obtained and in some cases infusible products.

Where the higher melting point epoxide resins produced by the two-step process are further reacted with polyhydric phenol approximately equivalent to the epoxide content of the resins, and with the use of a small amount of catalyst such as the alkali salt of the polyhydric phenol, the resulting mixture on heating will react to produce higher melting, higher molecular weight and infusible products. Similarly, in the second step of the two-step process, where the amount of dihydric phenol is approximately equivalent to the epoxide content of the initial resin, and the reaction is carried out with the addition of an alkaline catalyst, infusible and insoluble products can be obtained.

Various polyfunctional cross-linking reactants can be used to react with the higher melting point epoxide resins, such as amines, to produce amine-epoxide products which may be insoluble products, or other polyfunctional reactants such as diisocyanates, dialdehydes, dimercaptans, amides, etc.

Thus the new high melting point epoxide resins and also the compositions containing the initial resin and added dihydric phenol are valuable materials for use in the manufacture of varnishes, molding resins, adhesives, fibers, filaments, etc.

The new higher melting point resins polymerize or further react in the presence of a catalyst to give higher melting and finally infusible products. This polymerization reaction may be carried out after the epoxide composition or the higher melting epoxide resin has been spread out in thin layers in which case protective films are formed. The polymerization can be carried out in molds to give excellent infusible molded objects. The complex epoxide compositions make excellent bonding materials for glass when polymerized in layers between glass plates. They are likewise useful as material for the bonding and impregnation of wood, for fabric coating and impregnation, for surface coatings, both clear and pigmented, on glass, wood, and metal, etc.

The final infusible polymerization and reaction products made with the new compositions and with the high melting point epoxide resins have a remarkable combination of desirable properties, including resistance to water, solvents, alkalies and acids, toughness combined with hardness, flexibility at low temperatures, ability to withstand high temperatures with little or no discoloration, resistance to chemicals, wettability to most pigments, low viscosity at high solids content of solutions, and hardening of thick films through chemical reactions within the film itself when a suitable catalyst or crosslinking reactant is used so that paint and varnish coatings far beyond the usual thickness can be applied.

Such properties make the new compositions and products made therefrom valuable for many practical purposes.

This application is a continuation in part of my prior applications Serial No. 189,063, filed October 7, 1950 and Serial No. 199,932, filed December 8, 1950, which prior applications are continuations-in-part, respectively, of prior applications Serial No. 621,856, filed October 11, 1945 and Serial No. 617,176, filed September 18, 1945, now abandoned.

I claim:

1. Compositions capable on heating of forming high molecular weight epoxide resins, said compositions consisting essentially of a dihydric phenol free from reactive groups other than phenolic hydroxyl groups, and a low melting point epoxide resin resulting from the reaction with heating of a mixture of approximately 1 mol of dihydric phenol free from reactive groups other than phenolic hydroxyl groups with from about 1.2 to about 2 mols of a chlorhydrin selected from the group which consists of epichlorhydrin and glycerol dichlorhydrin and sufficient caustic alkali to combine with the chlorine of the chlorhydrin, said low melting point resins being polyethers of the dihydric phenols with the terminal groups of the polyethers including terminal epoxide groups, said polyethers being free from functional groups other than alcoholic hydroxyl and epoxide groups, the proportion of dihydric phenol to epoxide resin being less than that corresponding to the epoxide equivalent of the resin, whereby on heating the composition a higher molecular weight and a higher melting point epoxide resin is formed.

2. Epoxide resin compositions consisting essentially of a dihydric phenol free from reactive groups other than phenolic hydroxyl groups and a complex low melting point epoxide resin resulting from the reaction with heating of a mixture of approximately 1 mol of dihydric phenol free from reactive groups other than phenolic hydroxyl groups with from about 1.2 mols to about 1.5 mols of a chlorhydrin selected from the group which consists of epichlorhydrin and glycerol dichlorhydrin and sufficient aqueous caustic alkali to combine with the chlorine of the chlorhydrin, said resins being polyethers of the dihydric phenols with the terminal groups of the polyethers including terminal epoxy groups, said polyethers being free from functional groups other than alcoholic hydroxyl and epoxide groups, the proportion of dihydric phenol to epoxide resin being less than that corresponding to the epoxide equivalent of the resin, together with a small amount of an alkaline catalyst.

3. Compositions capable on heating of forming high molecular weight epoxide resins, said compositions consisting essentially of a dihydric phenol free from reactive groups other than phenolic hydroxyl groups and a complex epoxide resin resulting from the reaction with heating of a mixture of approximately 1 mol of dihydric phenol free from reactive groups other than phenolic hydroxyl groups with approximately 2 mols of epichlorhydrin and sufficient caustic alkali to combine with the chlorine of the epichlorhydrin, said resins being polyethers of the dihydric phenols with the terminal groups of the polyethers including terminal epoxy groups, said polyethers being free from functional groups other than alcoholic hydroxyl and epoxide groups, the proportion of dihydric phenol to epoxide resin being less than that corresponding to the epoxide equivalent of the resin, whereby on heating the composition a higher molecular weight and a higher melting point epoxide resin is formed.

4. Epoxide resin compositions consisting essentially of a dihydric phenol free from reactive groups other than phenolic hydroxyl groups and a complex epoxide resin resulting from the reaction with heating of a mixture of approximately 1 mol of dihydric phenol free from reactive groups other than phenolic hydroxyl groups with approximately 2 mols of epichlorhydrin and sufficient caustic alkali to combine with the chlorine of the epichlorhydrin, said resins being polyethers of the dihydric phenols with the terminal groups of the polyethers including terminal epoxy groups, said polyethers being free from functional groups other than alcoholic hydroxyl and epoxide groups, the proportion of dihydric phenol to epoxide resin being less than that corresponding to the epoxide equivalent of the resin, together with a small amount of an alkali catalyst.

5. Compositions as defined in claim 1, in which the dihydric phenol used in making the epoxide resin and used with said resin in the composition is p,p'-dihydroxydiphenyldimethyl methane.

6. Epoxide resins as defined in claim 2, in which the dihydric phenol used in making the epoxide resin and used with said resin in the composition is p,p'-dihydroxydiphenyldimethyl methane.

7. Epoxide resin compositions consisting essentially of p,p'-dihydroxydiphenyldimethyl methane and an epoxide resin resulting from the reaction with heating of a mixture of approximately 1 mol of p,p'-dihydroxydiphenyldimethyl methane with approximately 2 mols of epichlorhydrin and sufficient caustic alkali to combine with the chlorine of the epichlorhydrin, said resin being a polyether resin of p,p'-dihydroxydiphenyldimethyl methane with terminal groups including terminal epoxy groups, said polyether resin being free from functional groups other than alcoholic hydroxyl and epoxide groups, the proportions of p,p'-dihydroxydiphenyldimethyl methane to epoxide resin being less than that corresponding to the epoxide equivalent of the resin, and said composition also containing a small amount of an alkaline catalyst.

8. The two-stage process of forming high molecular weight epoxide resins which comprises reacting with heating an initial mixture of a chlorhydrin selected from the class which consists of epichlorhydrin and glycerol dichlorhydrin with a dihydric phenol free from reactive groups other than phenolic hydroxyl groups in the proportions of from about 1.2 to about 2 mols of chlorhydrin to 1 mol of dihydric phenol in the presence of aqueous caustic alkali sufficient to combine with the chlorine of the chlorhydrin, separating the byproduct salt and any aqueous alkali from the resulting epoxide resin, admixing a dihydric phenol free from reactive groups, other than phenolic hydroxyl groups, with the epoxide resin, the proportions of dihydric phenol to epoxide resin being less than that corresponding to the epoxide equivalent of the resin, and heating to effect reaction of the dihydric phenol with said epoxide resin to form a higher molecular weight and higher melting point epoxide resin.

9. The two-stage process according to claim 8 in which approximately 2 mols of epichlorhydrin are reacted with approximately 1 mol of dihydric phenol in the first stage of the process.

10. The process according to claim 8 in which from about 1.2 to about 1.5 mols of chlorhydrin are reacted with 1 mol of dihydric phenol in the first stage of the process.

11. The two-stage process according to claim 8 in which the dihydric phenol reacted with the chlorhydrin and alkali and admixed with the epoxide resin in the second stage of the process is p,p'-dihydroxydiphenyldimethyl methane.

12. The process according to claim 8 in which the reaction of the dihydric phenol and epoxide resin is carried out with a small amount of an alkaline catalyst.

13. High melting point epoxide resins resulting from the process of claim 8.

14. High melting point epoxide resins resulting from the process of claim 11.

SYLVAN OWEN GREENLEE.

No references cited.